US012742679B2

(12) United States Patent
Xu et al.

(10) Patent No.: US 12,742,679 B2
(45) Date of Patent: Sep. 22, 2026

(54) SELF-REFERENCING SPECTRAL CONSTRAINT-BASED SPECTRAL RECONSTRUCTION METHOD AND APPARATUS, DEVICE, AND MEDIUM

(71) Applicant: NATIONAL UNIVERSITY OF DEFENSE TECHNOLOGY, Changsha (CN)

(72) Inventors: Jiangming Xu, Changsha (CN); Junrui Liang, Changsha (CN); Zhongming Huang, Changsha (CN); Jun Li, Changsha (CN); Jun Ye, Changsha (CN); Yanzhao Ke, Changsha (CN); Min Jiang, Changsha (CN); Yidong Guo, Changsha (CN); Junhong He, Changsha (CN); Xiaoya Ma, Changsha (CN); Yang Zhang, Changsha (CN); Man Jiang, Changsha (CN); Tianfu Yao, Changsha (CN); Yue Tao, Changsha (CN); Can Li, Changsha (CN); Jian Wu, Changsha (CN); Jinyong Leng, Changsha (CN); Pu Zhou, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 19/270,516

(22) Filed: Jul. 16, 2025

(65) Prior Publication Data

US 2026/0219107 A1 Jul. 30, 2026

(30) Foreign Application Priority Data

Jan. 24, 2025 (CN) ........................ 202510117946.4

(51) Int. Cl.
*G01J 3/28* (2006.01)
*G01J 3/10* (2006.01)
(Continued)

(52) U.S. Cl.
CPC . *G01J 3/28* (2013.01); *G01J 3/10* (2013.01); *G06N 3/02* (2013.01);
(Continued)

(58) Field of Classification Search
CPC ........ G01J 3/28; G01J 3/10; G01J 2003/2826; G01J 2003/2836; G01J 2003/284;
(Continued)

(56) References Cited

U.S. PATENT DOCUMENTS

2021/0018745 A1* 1/2021 Huang .................. G02B 27/48
2024/0377304 A1 11/2024 Jang et al.

FOREIGN PATENT DOCUMENTS

CN 115633243 A * 1/2023 .............. G06N 3/08
CN 117470375 A 1/2024
(Continued)

OTHER PUBLICATIONS

Gao, Li, et al. "Computational spectrometers enabled by nanophotonics and deep learning." Nanophotonics 11.11 (2022): 2507-2529. (Year: 2022).*

(Continued)

*Primary Examiner* — Michelle M Iacoletti
*Assistant Examiner* — Noah JJ. Haney
(74) *Attorney, Agent, or Firm* — Bayramoglu Law Offices LLC

(57) ABSTRACT

A self-referencing spectral constraint-based spectral reconstruction method and apparatus, a device, and a medium are provided. The method includes: acquiring a total transmission matrix through a calibration; acquiring each observed speckle generated after target light passes through each
(Continued)

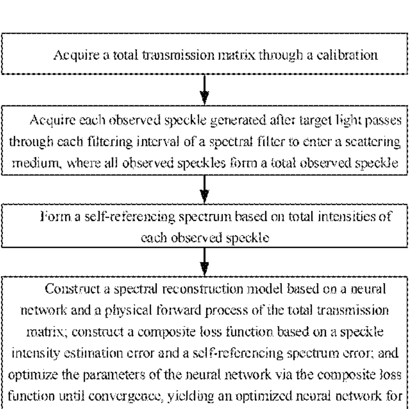

filtering interval of a spectral filter to enter a scattering medium, where all observed speckles form a total observed speckle; forming a self-referencing spectrum based on total intensities of each observed speckle; and constructing a spectral reconstruction model based on a neural network and a physical forward process of the total transmission matrix, constructing a composite loss function based on a speckle intensity estimation error and a self-referencing spectrum error, and optimizing the parameters of the neural network via the composite loss function until convergence, thereby yielding an optimized neural network for spectral reconstruction for a given total observed speckle.

12 Claims, 1 Drawing Sheet

(51) Int. Cl.
*G01N 21/47* (2006.01)
*G06N 3/02* (2006.01)

(52) U.S. Cl.
CPC .................. *G01J 2003/2826* (2013.01); *G01J 2003/2836* (2013.01); *G01J 2003/284* (2013.01); *G01J 2003/2866* (2013.01); *G01N 2021/479* (2013.01); *G01N 2201/1296* (2013.01)

(58) Field of Classification Search
CPC ............. G01J 2003/2866; G06N 3/02; G01N 2021/479; G01N 2201/1296
USPC ........................................ 356/300, 326, 328
See application file for complete search history.

(56) References Cited

FOREIGN PATENT DOCUMENTS

| | | | | | |
|---|---|---|---|---|---|
| CN | 118169793 | A | * | 6/2024 | ................ G01J 3/02 |
| WO | 2013188520 | A2 | | 12/2013 | |
| WO | WO-2024228394 | A1 | * | 11/2024 | ............. G06N 3/048 |

OTHER PUBLICATIONS

Kürüm, Ulas, et al. “Deep learning enabled real time speckle recognition and hyperspectral imaging using a multimode fiber array.” Optics express 27.15 (2019): 20965-20979. (Year: 2019).*

Wan, Yangyang, et al. “Reconstructive spectrum analyzer with high-resolution and large-bandwidth using physical-model and data-driven model combined neural network.” Laser & Photonics Reviews 17.7 (2023): 2201018. (Year: 2023).*

Li, Yitong, et al. “Hyperspectral imaging through scattering media via physics-informed learning.” Optics & Laser Technology 170 (2024): 110299. (Year: 2024).*

Zhang, Zan, et al. “On-chip reconstructive spectrometer based on parallel cascaded micro-ring resonators.” Applied Sciences 14.11 (2024): 4886. (Year: 2024).*

Junrui Liang, et al., Multi-wavelength spectral reconstruction with localized speckle pattern, Optics Communications, 2025, pp. 1-8, vol. 575 No. 131266.

* cited by examiner

Acquire a total transmission matrix through a calibration

↓

Acquire each observed speckle generated after target light passes through each filtering interval of a spectral filter to enter a scattering medium, where all observed speckles form a total observed speckle

↓

Form a self-referencing spectrum based on total intensities of each observed speckle

↓

Construct a spectral reconstruction model based on a neural network and a physical forward process of the total transmission matrix; construct a composite loss function based on a speckle intensity estimation error and a self-referencing spectrum error; and optimize the parameters of the neural network via the composite loss function until convergence, yielding an optimized neural network for spectral reconstruction

↓

Perform spectral reconstruction for a given total observed speckle based on the optimized neural network

FIG. 1

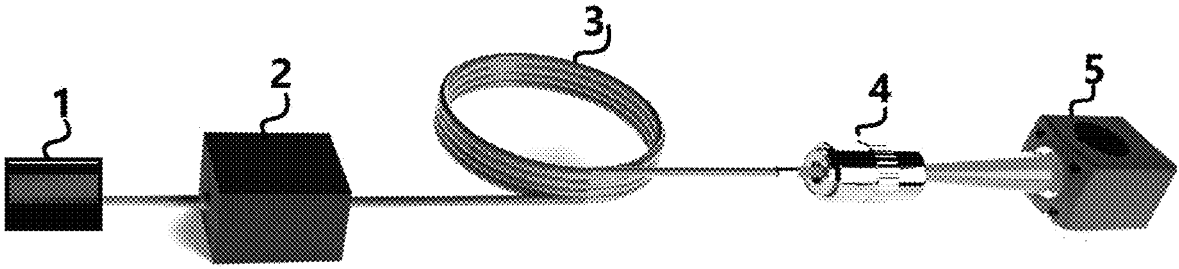

FIG. 2

SELF-REFERENCING SPECTRAL CONSTRAINT-BASED SPECTRAL RECONSTRUCTION METHOD AND APPARATUS, DEVICE, AND MEDIUM

CROSS REFERENCE TO THE RELATED APPLICATIONS

This application is based upon and claims priority to Chinese Patent Application No. 202510117946.4, filed on Jan. 24, 2025, the entire contents of which are incorporated herein by reference.

TECHNICAL FIELD

The present disclosure mainly relates to the technical field of spectral reconstruction, and in particular to a self-referencing spectral constraint-based spectral reconstruction method and apparatus, a device, and a medium.

BACKGROUND

Spectrum is referred to as the "optical gene", and spectrometers serve as cornerstone instruments in modern scientific research and industry, playing vital roles in fields such as environmental monitoring, biochemistry, and laser characterization. However, traditional spectrometers employing gratings, prisms, or resonant cavities exhibit some limitations that hinder their application in specialized scenarios. These limitations include the unresolved trade-off between resolution and compactness, the constrained single-measurement bandwidth (free spectral range), and the time-consuming measurements caused by scanning components.

In recent years, speckle reconstructive spectrometers have garnered significant attention due to their advantages of high resolution, miniaturization, freedom from free spectral range limitation, and high-speed measurement. The operational principle of speckle reconstructive spectrometers involves injecting a light beam into a disordered medium, where each wavelength generates a unique intensity distribution on the detector array, serving as a spectral "fingerprint". This linear scattering-based "spectral-spatial" mapping relationship allows for spectral reconstruction via inverse problem solving algorithms upon observation of new speckles.

Due to the diversity of spectral profiles, traditional spectral reconstruction algorithms typically require prior knowledge of the target spectrum (e.g., sparsity) to meticulously tune algorithmic parameters manually. Otherwise, the accuracy of spectral reconstruction will degrade. In recent years, neural network-based supervised learning models have demonstrated the capability to directly learn this "spectral-spatial" mapping relationship from extensive data pairs, allowing for spectrum inference from observed speckles. However, this approach necessitates the acquisition of large-scale, diverse, and high-quality training datasets. Additionally, purely data-driven networks suffer from limited generalization capability and weak physical interpretability in their predictions.

SUMMARY

In response to the technical problems in the prior art, the present disclosure proposes a self-referencing spectral constraint-based spectral reconstruction method and apparatus, a device, and a medium. The present disclosure reconstructs a spectrum through "spectral-spatial" mapping in a disordered scattering medium, combining a neural network with a physical model of "spectral-spatial" mapping.

To achieve the above objective, the present disclosure adopts the following technical solutions:

In an aspect, the present disclosure provides a speckle reconstructive spectrometer based on a self-referencing constraint and a physics-enhanced neural network, including: acquiring a total transmission matrix through a calibration;

- acquiring an $i^{th}$ observed speckle generated after target light passes through an $i^{th}$ filtering interval of a spectral filter to enter a scattering medium, where i=1, 2, . . . , K; K filtering intervals correspond to K observed speckles; and the K observed speckles form a total observed speckle;
- summing an intensity of the $i^{th}$ observed speckle, and acquiring a total intensity of the $i^{th}$ observed speckle, where total intensities of the K observed speckles form a self-referencing spectrum;
- constructing a spectral reconstruction model based on a neural network and a physical forward process of the total transmission matrix; constructing a composite loss function based on a speckle intensity estimation error and a self-referencing spectrum error; and optimizing the parameters of the neural network via the composite loss function until convergence, yielding an optimized neural network for spectral reconstruction; and
- performing spectral reconstruction for a given total observed speckle based on the optimized neural network.

Furthermore, the total transmission matrix is acquired through the calibration as follows:

- constructing a speckle-spectrum calibration optical setup including a high-resolution tunable narrow-linewidth calibration light source, the spectral filter, the scattering medium, an objective lens, and a detector, where the high-resolution tunable narrow-linewidth calibration light source is connected to the spectral filter; the spectral filter is connected to the scattering medium to generate the speckle; the speckle is output from the scattering medium and imaged onto the detector via the objective lens; the narrow-linewidth calibration light source has a typical tunable resolution at a picometer (pm) level, and has a 3 dB linewidth smaller than the tunable resolution; and the spectral filter has a typical nanometer (nm)-level bandwidth per filtering interval;
- performing, by the high-resolution tunable narrow-linewidth calibration light source, high-resolution wavelength step scanning for M times in sequence within the $i^{th}$ filtering interval;
- recording a two-dimensional speckle pattern corresponding to each wavelength behind the scattering medium; flattening the two-dimensional speckle pattern corresponding to each wavelength into an N×1 vector, and arranging M wavelengths in sequence in a column-wise manner; and forming a narrowband transmission matrix corresponding to the $i^{th}$ filtering interval, where i=1, 2, . . . , K; and
- diagonally concatenating narrowband transmission matrices corresponding to K filtering intervals, and forming the total transmission matrix $T_{(K\times N)\times(K\times M)}$.

During measurement, the high-resolution tunable narrow-linewidth calibration light source in the speckle-spectrum calibration optical setup is replaced with a target light source. The target light source outputs target light. The target light passes through the $i^{th}$ filtering interval of the spectral filter, enters the scattering medium, and generates the $i^{th}$ observed speckle, i=1, 2, . . . , K. The K filtering intervals correspond to K observed speckles. The K observed speckles form the total observed speckle.

In another aspect, the present disclosure provides a computer device, including a memory and a processor, where the memory is configured to store a computer program; and the processor is configured to execute the computer program, so as to implement the steps of the above self-referencing spectral constraint-based spectral reconstruction method.

In still another aspect, the present disclosure provide a computer-readable storage medium, where the computer-readable storage medium is configured to store a computer program; and the computer program is executable by a processor to implement the steps of the above self-referencing spectral constraint-based spectral reconstruction method.

In yet another aspect, the present disclosure provides a computer program product, where the computer program product is stored on a computer-readable storage medium, and includes a computer instruction, where the computer instruction is run by a processor, such that a computer device implements the steps of the above self-referencing spectral constraint-based spectral reconstruction method.

Compared with the prior art, the present disclosure has the following beneficial effects:

Compared to traditional spectral reconstruction models based on truncated singular value inversion, Lasso regularization, and Tikhonov regularization, the present disclosure offers the following advantages. The method of the present disclosure eliminates the need for prior knowledge of the target spectrum, instead relying solely on a neural network to provide implicit priors, and avoids the cumbersome manual parameter tuning process.

In contrast to data-driven neural networks, the method of the present disclosure requires no pre-training of the network, thereby eliminating dependence on large-scale, diverse datasets. The preparation and acquisition of such datasets in experiments often demand substantial human and material resources, coupled with stringent requirements for system and environmental stability. Notably, finely generating and annotating diverse spectral types presents significant challenges. On one hand, spectrally programmable filtering devices with mature performance remain scarce. On the other hand, acquiring fine annotation of spectral reference values typically requires high-precision measurement instruments, substantially increasing dataset development costs.

Compared to data-driven neural networks, the present disclosure achieves superior generalization capability in spectral reconstruction by embedding physical models into the reconstruction workflow, while ensuring strong physical interpretability of reconstruction results. Furthermore, the introduction of the self-referencing spectrum significantly enhances the accuracy and reliability of the reconstructed result.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show some embodiments of the present disclosure, and those of ordinary skill in the art may still derive other drawings from these drawings without creative efforts.

FIG. 1 is a flowchart of a self-referencing spectral constraint-based spectral reconstruction method according to an embodiment; and FIG. 2 is a structural diagram of a speckle-spectrum calibration optical setup according to an embodiment.

Reference Numerals: 1. narrow-linewidth calibration light source; 2. spectral filter; 3. scattering medium; 4. objective lens; and 5. detector.

DETAILED DESCRIPTION OF THE EMBODIMENTS

The following clearly and completely describes the technical solutions in the embodiments of the present disclosure with reference to the drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Referring to FIG. 1, an embodiment of the present disclosure provides a self-referencing spectral constraint-based spectral reconstruction method, including the following steps.

A total transmission matrix is acquired through a calibration.

Each observed speckle generated after target light passes through each filtering interval of a spectral filter to enter a scattering medium is acquired, and all observed speckles form a total observed speckle.

Total intensities of each observed speckle form a self-referencing spectrum.

A spectral reconstruction model is constructed based on a neural network and a physical forward process of the total transmission matrix. A composite loss function is constructed based on a speckle intensity estimation error and a self-referencing spectrum error. The parameters of the neural network are optimized via the composite loss function until convergence, yielding an optimized neural network for spectral reconstruction.

Spectral reconstruction is performed for a given total observed speckle based on the optimized neural network.

In a specific embodiment, the total transmission matrix can be acquired through the calibration as follows.

Referring to FIG. 2, FIG. 2 is a structural diagram of a speckle-spectrum calibration optical setup according to an embodiment. The speckle-spectrum calibration optical setup includes high-resolution tunable narrow-linewidth calibration light source 1, spectral filter 2, scattering medium 3, objective lens 4, and detector 5. The high-resolution tunable narrow-linewidth calibration light source 1 is connected to the spectral filter 2. The spectral filter 2 is connected to the scattering medium 3 to generate the speckle. The speckle is output from the scattering medium 3 and imaged onto the detector 5 via the objective lens 4. The spectral filter 2 is provided with i filtering intervals, which are set in sequence, $i=1, 2, \ldots, K$. The narrow-linewidth calibration light source has a typical tunable resolution at a picometer (pm) level, and has a 3 dB linewidth smaller than the tunable resolution; and the spectral filter has a typical nanometer (nm)-level bandwidth per filtering interval;

The high-resolution tunable narrow-linewidth calibration light source performs high-resolution wavelength step scanning for M times in sequence within the $i^{th}$ filtering interval. A two-dimensional speckle pattern corresponding to each wavelength is recorded behind the scattering medium. The two-dimensional speckle pattern corresponding to each wavelength is flattened into an $N \times 1$ vector, and M wavelengths are arranged in sequence in a column-wise manner. Narrowband transmission matrix $$T^i_{N\times M}$$

is formed for the $i^{th}$ filtering interval, where i=1, 2, . . . , K.

$$T^i_{N\times M}=\begin{bmatrix} t_{11} & t_{12} & t_{13} & & t_{1M} \\ t_{21} & t_{22} & t_{23} & & t_{2M} \\ & \vdots & & \ddots & \vdots \\ t_{N1} & t_{N2} & t_{N3} & \dots & t_{NM} \end{bmatrix}, i=1,2,\dots,K$$

Narrowband transmission matrices corresponding to K filtering intervals are diagonally concatenated, and the total transmission matrix is formed as $T_{(K\times N)\times(K\times M)}$:

$$T_{(K\times N)\times(K\times M)}=\begin{bmatrix} T^1_{N\times M} & 0 & 0 & \dots & 0 & 0 & 0 \\ 0 & T^2_{N\times M} & 0 & \dots & 0 & 0 & 0 \\ 0 & 0 & T^3_{N\times M} & \dots & 0 & 0 & 0 \\ \vdots & \vdots & \vdots & \ddots & \vdots & \vdots & \vdots \\ 0 & 0 & 0 & \dots & T^i_{N\times M} & 0 & 0 \\ \vdots & \vdots & \vdots & \vdots & \vdots & \ddots & \vdots \\ 0 & 0 & 0 & 0 & 0 & 0 & T^K_{N\times M} \end{bmatrix}$$

During a measurement stage, each observed speckle generated after target light passes through each filtering interval of a spectral filter to enter a scattering medium is acquired, and all observed speckles form a total observed speckle. Specifically, the speckle-spectrum measurement optical setup is formed by replacing the high-resolution tunable narrow-linewidth calibration light source in the speckle-spectrum calibration optical setup with a target light source. The target light source outputs target light. The target light passes through the $i^{th}$ filtering interval of the spectral filter, and enters the scattering medium. The corresponding speckle is recorded after the scattering medium to generate the $i^{th}$ observed speckle $$I^i_N,\ i=1,2,\dots,K.$$

The K filtering intervals correspond to K observed speckles. The K observed speckles $$I^i_N$$

form the total observed speckle $I_{(K\times N)\times 1}$.

An intensity of the $i^{th}$ observed speckle $$I^i_N$$

is summed, and total intensities of the K observed speckles are acquired to form self-referencing spectrum $S_{SR}$.

The K observed speckles $$I^i_N$$

and K narrowband transmission matrices $$T^i_{N\times M}$$

respectively correspond to K M×1 narrowband target spectra $$S^i_M.$$

The K M×1 narrowband target spectra $$S^i_M$$

are concatenated in sequence to form total target spectrum $S_{(K\times M)\times 1}$.

The relationship among the total observed speckle, total transmission matrix, and total target spectrum can be described by the following "spectral-spatial" mapping forward physical model. Specifically, a model is constructed to characterize the relationship among the total observed speckle, total transmission matrix, and total target spectrum as follows:

$$I_{(K\times N)\times 1}=T_{(K\times N)\times(K\times M)}\cdot S_{(K\times M)\times 1}$$

The total observed speckle is $$I_{(K\times N)\times 1}=\begin{bmatrix} I^1_N \\ I^2_N \\ I^3_N \\ \vdots \\ I^i_N \\ \vdots \\ I^K_N \end{bmatrix}, \text{ and } I^i_N$$

denotes the $i^{th}$ observed speckle.

The total transmission matrix is $$T_{(K\times N)\times(K\times M)}=\begin{bmatrix} T^1_{N\times M} & 0 & 0 & \dots & 0 & 0 & 0 \\ 0 & T^2_{N\times M} & 0 & \dots & 0 & 0 & 0 \\ 0 & 0 & T^3_{N\times M} & \dots & 0 & 0 & 0 \\ \vdots & \vdots & \vdots & \ddots & \vdots & \vdots & \vdots \\ 0 & 0 & 0 & \dots & T^i_{N\times M} & 0 & 0 \\ \vdots & \vdots & \vdots & \vdots & \vdots & \ddots & \vdots \\ 0 & 0 & 0 & 0 & 0 & 0 & T^K_{N\times M} \end{bmatrix}.$$

$$T^i_{N\times M}$$

denotes the narrowband transmission matrix corresponding to the $i^{th}$ filtering interval, $$T^i_{N\times M}=\begin{bmatrix} t^i_{11} & t^i_{12} & t^i_{13} & & t^i_{1M} \\ t^i_{21} & t^i_{22} & t^i_{23} & & t^i_{2M} \\ \vdots & & & \ddots & \vdots \\ t^i_{N1} & t^i_{N2} & t^i_{N3} & \dots & t^i_{NM} \end{bmatrix}.$$

The target spectrum is $$S_{(K\times M)\times 1}=\begin{bmatrix} s^1_M \\ s^2_M \\ s^3_M \\ \vdots \\ s^i_M \\ \vdots \\ s^K_M \end{bmatrix}, \text{ and } s^i_M$$

denotes the $i^{th}$ M×1 narrowband target spectrum.

The present disclosure constructs a neural network-based spectral reconstruction model, where the weight of the neural network is randomly initialized. The neural network architecture includes but is not limited to convolutional neural networks and multilayer perceptrons. The measured total observed speckle is input into the neural network to output a total target spectrum estimate. During the initial phase, as the weight of the neural network remains unoptimized, the initially total target spectrum estimate is inaccurate. Based on the aforementioned relationship model among the total observed speckle, the total transmission matrix, and the total target spectrum, the total observed speckle estimate is further computed. The present disclosure employs a composite loss function constructed from the speckle intensity estimation error and the self-referencing spectrum error to update the weight of the neural network until the composite loss function converges, yielding an optimized spectral reconstruction neural network. The speckle intensity estimation error is acquired as follows.

Based on physical model F(•) for the total observed speckle, the total transmission matrix, and the total target spectrum, a total observed speckle estimate corresponding to a total target spectrum estimate output by the neural network. Specifically, substituting the total target spectrum estimate output by the neural network as the total target spectrum into the physical model yields the total observed speckle estimate corresponding to the total target spectrum estimate.

A mean squared error between the total observed speckle estimate and the total observed speckle is calculated, and speckle intensity estimation error $I_{Loss}$ is acquired.

The self-referencing spectrum error is acquired as follows.

The total observed speckle is input into the neural network to output a total target spectrum estimate.

The total target spectrum estimate is downsampled, and a mean squared error between the total target spectrum estimate and the self-referencing spectrum is calculated, and the self-referencing spectrum error $S_{Loss}$ is acquired.

The composite loss function is $Loss=I_{Loss}+\lambda S_{Loss}$, where $\lambda$ is a weighting coefficient that can be acquired through generalized cross-validation.

The present disclosure ensures a physical model constraint on the output of the neural network by embedding the "spectral-spatial" mapping model into the neural network. However, to enhance spectral measurement accuracy and credibility, the neural network's loss function must also incorporate measured spectral data, as discrepancies between the model and actual physical processes remain. Existing commercial temporal filtering devices typically offer wide-range spectral filtering with nanometer-level resolution and demonstrate good compatibility with most speckle reconstruction spectral measurement systems. Integrating low-cost commercial temporal filtering devices can conveniently provide a coarse yet highly accurate self-referencing value to correct potentially distorted spectral reconstruction results.

Another embodiment provides a self-referencing spectral constraint-based spectral reconstruction apparatus, including: a calibration module, a measurement module, a self-referencing spectrum calculation module, a network optimization module, and a spectral reconstruction module.

The calibration module is configured to perform a calibration, so as to acquire a total transmission matrix.

The measurement module is configured to acquire an $i^{th}$ observed speckle generated after target light passes through an $i^{th}$ filtering interval of a spectral filter to enter a scattering medium, where i=1, 2, . . . , K; K filtering intervals correspond to K observed speckles; and the K observed speckles form a total observed speckle.

The self-referencing spectrum calculation module is configured to sum an intensity of the $i^{th}$ observed speckle, and acquire a total intensity of the $i^{th}$ observed speckle, where total intensities of the K observed speckles form a self-referencing spectrum.

The network optimization module is configured to construct a spectral reconstruction model based on a neural network and a physical forward process of the total transmission matrix; construct a composite loss function based on a speckle intensity estimation error and a self-referencing spectrum error; and optimize the parameters of the neural network via the composite loss function until convergence, yielding an optimized neural network for spectral reconstruction.

The spectral reconstruction module is configured to perform spectral reconstruction based on the optimized neural network and the total observed speckle.

First, the total observed speckle is input into the neural network to acquire the total target spectrum estimate. On one hand, the total target spectrum estimate is downsampled, and a mean squared error between the total target spectrum estimate and the self-referencing spectrum is calculated, and the self-referencing spectrum error $S_{Loss}$ is acquired. On the other hand, the physical model F(•) is applied to the total target spectrum estimate to generate the total observed speckle estimate. The mean squared error between the total observed speckle estimate and the total observed speckle is calculated, and the speckle intensity estimation error $I_{Loss}$ is acquired. The loss function is constructed based on the speckle intensity estimation error and the self-referencing spectrum error. The parameters of the neural network are optimized via the composite loss function until convergence, yielding an optimized neural network for spectral reconstruction.

Similarly, the calibration module includes a speckle-spectrum calibration optical setup. The speckle-spectrum calibration optical setup includes a high-resolution tunable narrow-linewidth calibration light source, the spectral filter, the scattering medium, an objective lens, and a detector. The high-resolution tunable narrow-linewidth calibration light source is connected to the spectral filter. The spectral filter is connected to the scattering medium to generate the speckle. The speckle is output from the scattering medium and imaged onto the detector via the objective lens.

The high-resolution tunable narrow-linewidth calibration light source performs high-resolution wavelength step scanning for M times in sequence within the $i^{th}$ filtering interval. A two-dimensional speckle pattern corresponding to each wavelength is recorded behind the scattering medium. The two-dimensional speckle pattern corresponding to each wavelength is flattened into an N×1 vector, and M wavelengths are arranged in sequence in a column-wise manner. A narrowband transmission matrix corresponding to the $i^{th}$ filtering interval is formed, where i=1, 2, . . . , K.

Narrowband transmission matrices corresponding to K filtering intervals are diagonally concatenated, and the total transmission matrix is formed as $T_{(K\times N)\times(K\times M)}$.

Similarly, the measurement module includes a speckle-spectrum measurement optical setup. The speckle-spectrum measurement optical setup is formed by replacing the high-resolution tunable narrow-linewidth calibration light source in the speckle-spectrum calibration optical setup with a target light source. The target light source is configured to output target light.

In the network optimization module, the speckle intensity estimation error is acquired as follows. Based on the physical model F(•) for the total observed speckle, the total transmission matrix, and the total target spectrum, the total observed speckle estimate corresponding to the total target spectrum estimate output by the neural network. The mean squared error between the total observed speckle estimate and the total observed speckle is calculated, and the speckle intensity estimation error $I_{Loss}$ is acquired. The self-referencing spectrum error is acquired as follows. The total observed speckle is input into the neural network to output a total target spectrum estimate. The total target spectrum estimate is downsampled, and a mean squared error between the total target spectrum estimate and the self-referencing spectrum is calculated, and the self-referencing spectrum error $S_{Loss}$ is acquired.

The composite loss function is $Loss=I_{Loss}+\lambda S_{Loss}$, where $\lambda$ is a weighting coefficient.

In another aspect, the present disclosure provides a computer device, including a memory and a processor, where the memory is configured to store a computer program; and the processor is configured to execute the computer program, so as to implement the steps of the self-referencing spectral constraint-based spectral reconstruction method provided in any one of the above embodiments. The computer device may be a server. The computer device includes a processor, a memory, a network interface, and a database that are connected through a system bus. The processor of the computer device is configured to provide calculation and control capabilities. The memory of the computer device includes a nonvolatile storage medium and an internal memory. The nonvolatile storage medium stores an operating system, a computer program, and a database. The internal memory provides an environment for operation of the operating system and the computer program in the nonvolatile storage medium. The database of the computer device is configured to store sample data. The network interface of the computer device is configured to communicate with an external terminal through a network.

In still another aspect, the present disclosure provide a computer-readable storage medium, where the computer-readable storage medium is configured to store a computer program; and the computer program is executable by a processor to implement the steps of the self-referencing spectral constraint-based spectral reconstruction method provided in any one of the above embodiments.

Those of ordinary skill in the art may understand that all or some of the procedures in the method of the foregoing embodiments may be implemented by a computer program instructing related hardware. The computer program may be stored in a nonvolatile computer-readable storage medium. When the computer program is executed, the procedures in the embodiments of the foregoing method may be performed. Any reference to a memory, a storage, a database, or other mediums used in various embodiments provided in the present disclosure may include a nonvolatile memory and/or a volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As description rather than limitation, the RAM can be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

Content not mentioned in the present disclosure shall be a widely-known technology.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

The above embodiments only represent some implementations of the present disclosure, and the description thereof is more specific and detailed, but cannot be construed as a limitation on the scope of the present disclosure. It should be noted that, for a person of ordinary skill in the art, several variations and improvements can be made without departing from the concept of the present disclosure, all of which fall within the protection scope of the present disclosure. Therefore, the protection scope of the present disclosure should be subject to the protection scope defined by the claims.

The above described are merely preferred embodiments of the present disclosure and is not intended to limit the present disclosure, and various changes and modifications of the present disclosure may be made by those skilled in the art. Any modification, equivalent substitution, improvement, etc. within the spirit and principles of the present disclosure shall fall within the scope of protection of the present disclosure.

What is claimed is:

1. A self-referencing spectral constraint-based spectral reconstruction method, comprising:

acquiring a total transmission matrix through a calibration;

acquiring an $i^{th}$ observed speckle generated after target light passes through an $i^{th}$ filtering interval of a spectral filter to enter a scattering medium, wherein i=1, 2, . . . , K; K filtering intervals correspond to K observed speckles; and the K observed speckles form a total observed speckle;

summing an intensity of the $i^{th}$ observed speckle, and acquiring a total intensity of the $i^{th}$ observed speckle, wherein total intensities of the K observed speckles form a self-referencing spectrum;

constructing a spectral reconstruction model based on a neural network and a physical forward process of the total transmission matrix; constructing a composite loss function based on a speckle intensity estimation error and a self-referencing spectrum error; and optimizing parameters of the neural network via the composite loss function until convergence, yielding an optimized neural network for a spectral reconstruction, wherein the speckle intensity estimation error is acquired by: calculating, based on a physical model F(•) for the total observed speckle, the total transmission matrix and a total target spectrum, a total observed speckle estimate corresponding to a total target spectrum estimate output by the neural network; and calculating a mean squared error between the total observed speckle estimate and the total observed speckle, and acquiring the speckle intensity estimation error $I_{Loss}$; and the self-referencing spectrum error is acquired by: inputting the total observed speckle into the neural network, outputting the total target spectrum estimate, downsampling the total target spectrum estimate, calculating a mean squared error between the total target spectrum estimate and the self-referencing spectrum, and acquiring the self-referencing spectrum error $S_{Loss}$; and performing the spectral reconstruction for the total observed speckle based on the optimized neural network.

2. The self-referencing spectral constraint-based spectral reconstruction method according to claim 1, wherein the total transmission matrix is acquired through the calibration as follows:

connecting a high-resolution tunable narrow-linewidth calibration light source to the spectral filter, and connecting the spectral filter to the scattering medium to generate a speckle, wherein the high-resolution tunable narrow-linewidth calibration light source has a tunable resolution at a picometer (pm)-level, and has a 3 dB linewidth smaller than the tunable resolution; and the spectral filter has a bandwidth per filtering interval at a nanometer (nm)-level;

performing, by the high-resolution tunable narrow-linewidth calibration light source, high-resolution wavelength step scanning for M times in sequence within the $i^{th}$ filtering interval;

recording a two-dimensional speckle pattern corresponding to each wavelength behind the scattering medium; flattening the two-dimensional speckle pattern corresponding to each wavelength into an N×1 vector, and arranging M wavelengths in sequence in a column-wise manner; and forming a narrowband transmission matrix corresponding to the $i^{th}$ filtering interval, wherein i=1, 2, . . . , K; and diagonally concatenating narrowband transmission matrices corresponding to the K filtering intervals and forming the total transmission matrix $T_{(K\times N)\times(K\times M)}$.

3. The self-referencing spectral constraint-based spectral reconstruction method according to claim 2, wherein the physical model F(•) for the total observed speckle, the total transmission matrix and the total target spectrum is expressed by:

$$I_{(K\times N)\times 1} = T_{(K\times N)\times(K\times M)} \cdot S_{(K\times M)\times 1}$$

wherein the total observed speckle is $$I_{(K\times N)\times 1} = \begin{bmatrix} I_N^1 \\ I_N^2 \\ I_N^3 \\ \vdots \\ I_N^i \\ \vdots \\ I_N^K \end{bmatrix}, \text{ and } I_N^i$$

denotes the $i^{th}$ observed speckle;

the total transmission matrix is $$T_{(K\times N)\times(K\times M)} = \begin{bmatrix} T_{N\times M}^1 & 0 & 0 & \dots & 0 & 0 & 0 \\ 0 & T_{N\times M}^2 & 0 & \dots & 0 & 0 & 0 \\ 0 & 0 & T_{N\times M}^3 & \dots & 0 & 0 & 0 \\ \vdots & \vdots & \vdots & \ddots & \vdots & \vdots & \vdots \\ 0 & 0 & 0 & \dots & T_{N\times M}^i & 0 & 0 \\ \vdots & \vdots & \vdots & \vdots & \vdots & \ddots & \vdots \\ 0 & 0 & 0 & 0 & 0 & 0 & T_{N\times M}^K \end{bmatrix},$$

and $T_{N\times M}^i$ denotes the narrowband transmission matrix corresponding to the $i^{th}$ filtering interval; and the total target spectrum is $$S_{(K\times M)\times 1} = \begin{bmatrix} s_M^1 \\ s_M^2 \\ s_M^3 \\ \vdots \\ s_M^i \\ \vdots \\ s_M^K \end{bmatrix}, \text{ and } s_M^i$$

denotes an $i^{th}$ M×1 narrowband target spectrum.

4. The self-referencing spectral constraint-based spectral reconstruction method according to claim 3, wherein the composite loss function is $Loss=I_{Loss}+\lambda S_{Loss}$, wherein λ is a weighting coefficient.

5. The self-referencing spectral constraint-based spectral reconstruction method according to claim 2, wherein the composite loss function is $Loss=I_{Loss}+\lambda S_{Loss}$, wherein λ is a weighting coefficient.

6. The self-referencing spectral constraint-based spectral reconstruction method according to claim 1, wherein the composite loss function is $Loss=I_{Loss}+\lambda S_{Loss}$, wherein λ is a weighting coefficient.

7. A computer device, comprising a memory and a processor, wherein the memory is configured to store a computer program; and the computer program is executable by the processor to implement steps of the self-referencing spectral constraint-based spectral reconstruction method according to claim 1.

8. A non-transitory computer-readable storage medium, wherein the computer-readable storage medium is configured to store a computer program; and the computer program is executable by a processor to implement steps of the self-referencing spectral constraint-based spectral reconstruction method according to claim 1.

9. A self-referencing spectral constraint-based spectral reconstruction apparatus, comprising:

a calibration module, configured to perform a calibration to acquire a total transmission matrix;

a measurement module, configured to acquire an $i^{th}$ observed speckle generated after target light passes through an $i^{th}$ filtering interval of a spectral filter to enter a scattering medium, wherein i=1, 2, . . . , K; K filtering intervals correspond to K observed speckles; and the K observed speckles form a total observed speckle;

a self-referencing spectrum calculation module, configured to sum an intensity of the $i^{th}$ observed speckle, and acquire a total intensity of the $i^{th}$ observed speckle, wherein total intensities of the K observed speckles form a self-referencing spectrum;

a network optimization module, configured to: reconstruct a total target spectrum; construct a spectral reconstruction model based on a neural network and a physical forward process of the total transmission matrix; construct a composite loss function based on a speckle intensity estimation error and a self-referencing spectrum error; and optimize parameters of the neural network via the composite loss function until convergence, yielding an optimized neural network for a spectral reconstruction, wherein the speckle intensity estimation error is acquired by: calculating, based on a physical model F(•) for the total observed speckle, the total transmission matrix and the total target spectrum, a total observed speckle estimate corresponding to a total target spectrum estimate output by the neural network; and calculating a mean squared error between the total observed speckle estimate and the total observed speckle, and acquiring the speckle intensity estimation error $I_{Loss}$; and the self-referencing spectrum error is acquired by: inputting the total observed speckle into the neural network, outputting the total target spectrum estimate, downsampling the total target spectrum estimate, calculating a mean squared error between the total target spectrum estimate and the self-referencing spectrum, and acquiring the self-referencing spectrum error $S_{Loss}$; and a spectral reconstruction module, configured to perform the spectral reconstruction based on the optimized neural network and the total observed speckle.

10. The self-referencing spectral constraint-based spectral reconstruction apparatus according to claim 9, wherein the calibration module comprises a speckle-spectrum calibration optical setup; the speckle-spectrum calibration optical setup comprises a high-resolution tunable narrow-linewidth calibration light source, the spectral filter, the scattering medium, an objective lens and a detector; the high-resolution tunable narrow-linewidth calibration light source is connected to the spectral filter; the spectral filter is connected to the scattering medium to generate a speckle; the speckle is output from the scattering medium and imaged onto the detector via the objective lens; the high-resolution tunable narrow-linewidth calibration light source has a tunable resolution at a pm level, and has a 3 dB linewidth smaller than the tunable resolution; and the spectral filter has a bandwidth per filtering interval at an nm-level;

the high-resolution tunable narrow-linewidth calibration light source is configured to perform high-resolution wavelength step scanning for M times in sequence within the $i^{th}$ filtering interval; a two-dimensional speckle pattern corresponding to each wavelength is recorded behind the scattering medium; the two-dimensional speckle pattern corresponding to each wavelength is flattened into an N×1 vector, and M wavelengths are arranged in sequence in a column-wise manner; and a narrowband transmission matrix corresponding to the $i^{th}$ filtering interval is formed, wherein i=1, 2, . . . , K; and narrowband transmission matrices corresponding to the K filtering intervals are diagonally concatenated, thereby forming the total transmission matrix $T_{(K\times N)\times(K\times M)}$.

11. The self-referencing spectral constraint-based spectral reconstruction apparatus according to claim 10, wherein the measurement module comprises a speckle-spectrum measurement optical setup; the speckle-spectrum measurement optical setup is formed by replacing the high-resolution tunable narrow-linewidth calibration light source in the speckle-spectrum calibration optical setup with a target light source; and the target light source is configured to output the target light.

12. The self-referencing spectral constraint-based spectral reconstruction apparatus according to claim 10, wherein the composite loss function is $Loss=I_{Loss}+\lambda S_{Loss}$, wherein λ is a weighting coefficient.

* * * * *